United States Patent [19]

Takeda et al.

[11] Patent Number: 5,351,439
[45] Date of Patent: Oct. 4, 1994

[54] POWER WINDOW APPARATUS HAVING IMPROVED SAFETY DEVICE

[75] Inventors: Hitoshi Takeda; Keiichi Tajima; Toru Nakayama, all of Shizuoka, Japan

[73] Assignee: Koito Manufacturing Co., Ltd., Tokyo, Japan

[21] Appl. No.: 47,437

[22] Filed: Apr. 15, 1993

[30] Foreign Application Priority Data

Apr. 21, 1992 [JP] Japan ............................. 4-033043[U]
Oct. 21, 1992 [JP] Japan ............................. 4-305855

[51] Int. Cl.$^5$ ............................................. E05F 15/16
[52] U.S. Cl. ............................................. 49/28; 49/31; 49/349; 49/506
[58] Field of Search .................. 49/28, 26, 25, 31, 506, 49/349

[56] References Cited

U.S. PATENT DOCUMENTS

| | | | |
|---|---|---|---|
| 4,641,067 | 2/1987 | Iizawa et al. | 49/28 X |
| 4,701,684 | 10/1987 | Seidel et al. | 49/28 X |
| 4,831,509 | 5/1989 | Jones et al. | 49/28 X |
| 4,943,757 | 7/1990 | Richter et al. | 49/28 X |

FOREIGN PATENT DOCUMENTS 2026723 2/1980 United Kingdom .
2169105 7/1986 United Kingdom .

*Primary Examiner*—Philip C. Kannan
*Attorney, Agent, or Firm*—Sughrue, Mion, Zinn, Macpeak & Seas

[57] ABSTRACT

A power window apparatus with a safety device capable of taking a safety measure when it detects the neck or hand of a passenger being caught in the window, which device can exactly detect such a dangerous state and take a reliable safety measure to correct for the same, irrespective of variations of ambient temperature. A temperature sensor provided which senses the temperature of the motor acting as a drive source for moving the window. This temperature is closely related to the ambient temperature. A reference value for the motor speed for detecting an object-caught state is altered according to the detected temperature, thereby providing exact detection of the object-caught state irrespective of temperature variations. Preferably, the power transmission for the window, the temperature sensor, and a controller structure are mounted on an inner side of a single housing.

19 Claims, 8 Drawing Sheets

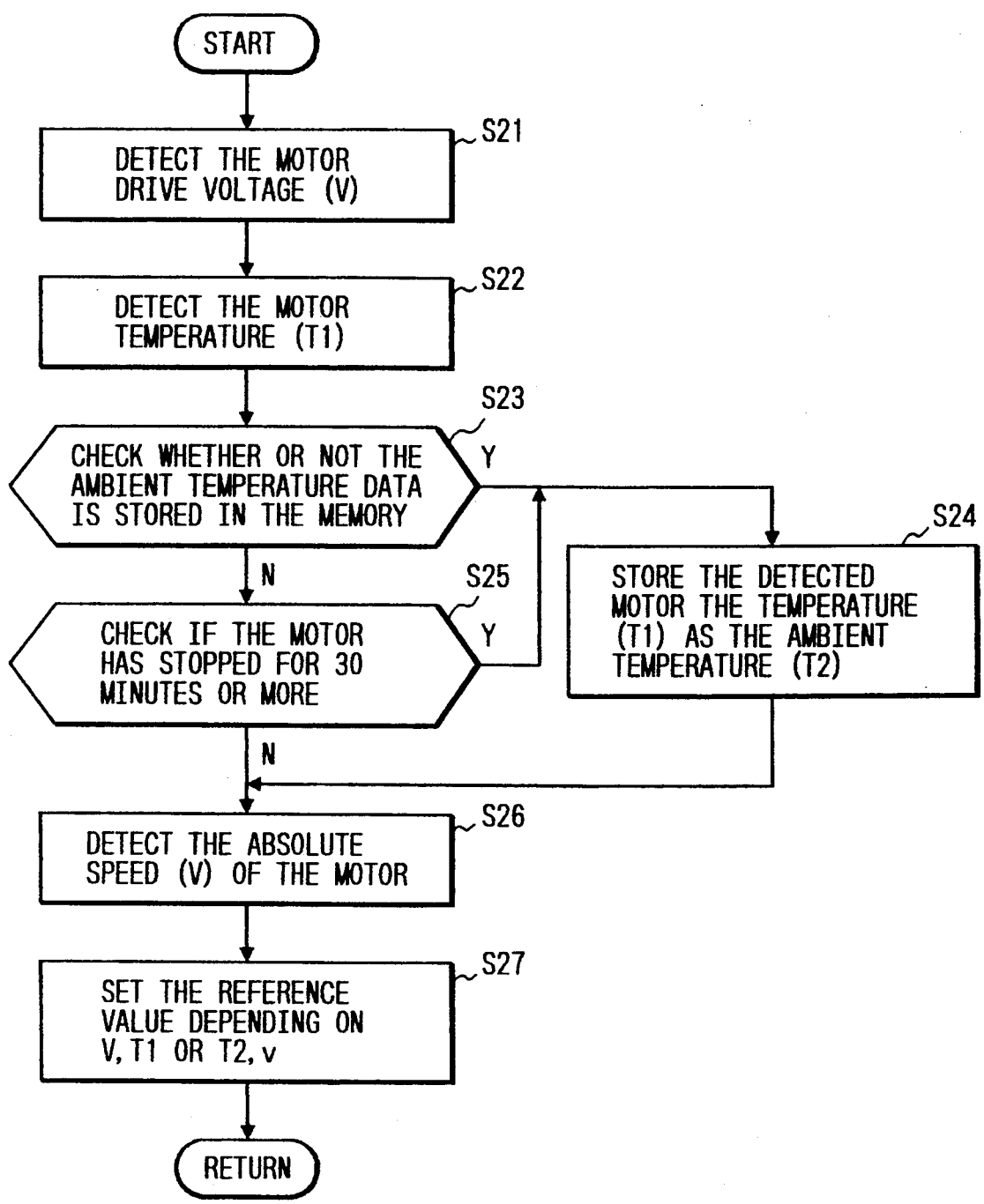

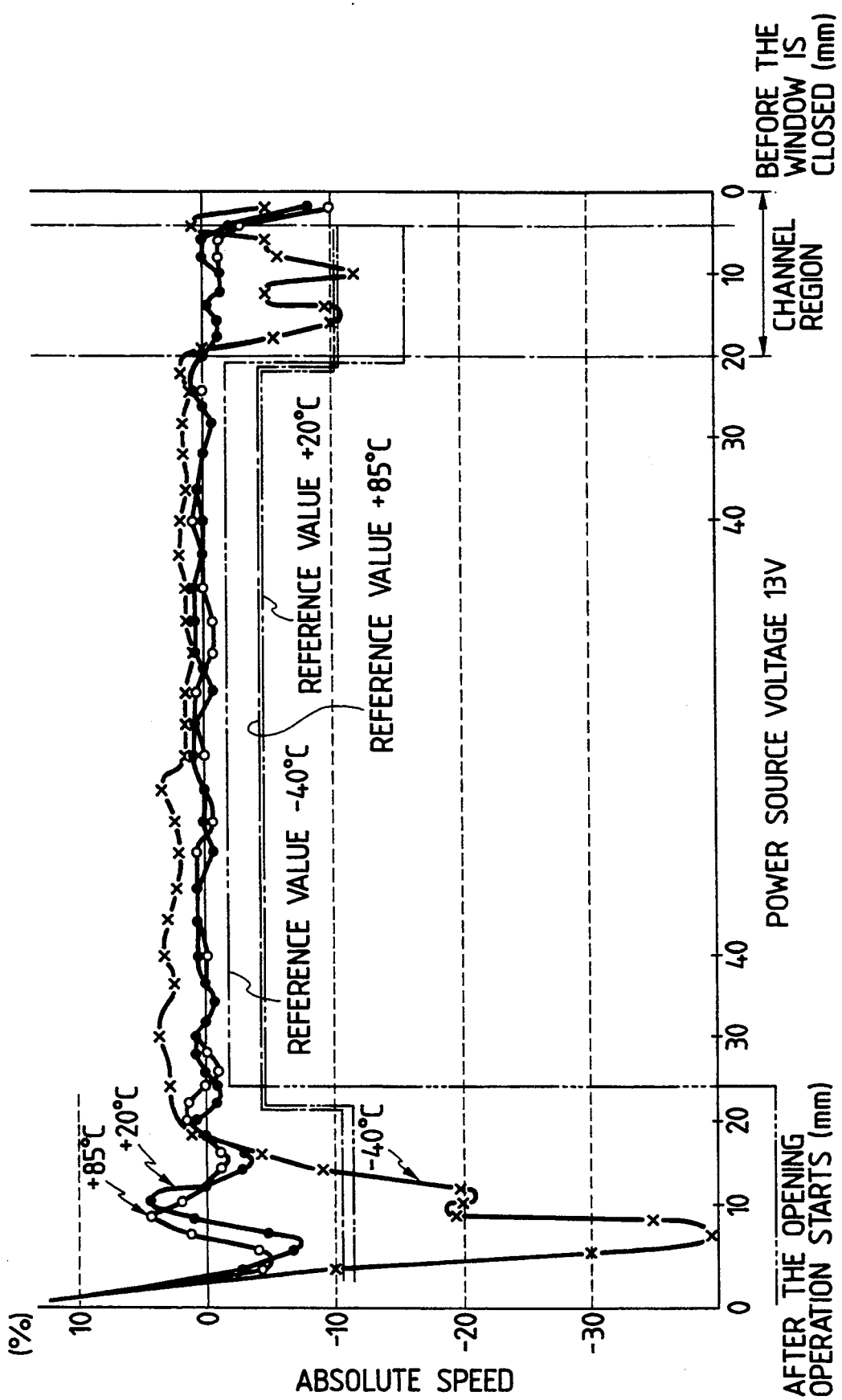

POWER WINDOW APPARATUS HAVING IMPROVED SAFETY DEVICE

BACKGROUND OF THE INVENTION

The present invention relates to a power window apparatus for use with a motor vehicle for driving a window glass for opening and closing a window using power supplied by a drive source, e.g., a motor. More particularly, the invention relates to a power window apparatus with a safety device which performs a safety control operation when the hand or neck of a driver or passenger is interposed between the window glass and the sash. In one aspect, the invention particularly relates to the structure in a power window apparatus of a drive unit including a motor.

Generally, a power window apparatus is constructed so as to drive the window glass for opening and closing purposes using a motor, for example, as shown in FIG. 2. In this figure, which schematically shows the construction of the power window apparatus, a window drive mechanism 2 is disposed under the window of a motor vehicle. In the mechanism, a rail 3 is mounted on the body frame of the motor vehicle in a vertically arrayed state. A slider 4, mounted on the rail 2, is slidable along the rail. A wire 5 is connected to the slider 4 and a drive unit 7 and is wound around pulleys 6, which are located at the top and bottom of the slider 4. When a motor contained in the drive unit 7 is driven, the slider 4 is vertically moved by the wire 5. A window glass 1 is mounted to the slider 4. With vertical movement of the slider 4, the window glass 1 opens or closes a window space defined by a sash 8.

In the power window apparatus of this type in which the window glass is automatically moved for opening and closing by the drive source, a dangerous situation occurs when the hand or neck of a passenger is interposed between the window and the sash. To cope with this, a safety device has been proposed. The safety device operates such that when it detects a state where an object is interposed between the window glass and the sash, it stops the movement of the window glass or forcibly moves the window glass in the opening direction.

To detect the state where an object is caught in the window, the safety device uses a current detector for detecting the drive current to the motor of the drive unit 7. When the object is caught in the window glass, the load of the motor increases, and hence the motor drive current increases. The drive current detector detects this increase of the motor drive current. In response to the output signal of the drive current detector when it detects the increase of the drive current, the safety device controls, for safety, the movement of the window glass so as to allow the object to be released.

The safety device as mentioned above detects the state of an object being caught in the window on the basis of the increase of the motor drive current. Before the drive current increases, some time elapses after the object is caught in the window glass. As a result, the safety control by the safety device starts, with a time lag, after the object is actually caught in the window glass. This fact implies that when the neck of a passenger is caught in the window glass, the state of the neck being caught continues until the safety device starts the safety control operation. In this respect, the safety device provides an unsatisfactory safety measure.

Another safety device has been proposed. In this device, the opening/closing movement of the window glass is constantly monitored. When the closing movement of the window glass stops at any other position than a position of the window glass where it is completely closed, the safety device decides that the window glass has caught an object. To make the decision, the safety device detects the motor speed during the opening/closing movement of the window glass, and recognizes a decrease of the motor speed on the basis of a comparison of the detected motor speed with a reference value. The safety device is improved in that it can quickly start the safety control operation.

However, the motor speed generally varies depending on ambient conditions of the motor, such as temperature and humidity. Accordingly, the safety device using the reference value cannot precisely make the decision whether or not the object is caught in the window glass when the ambient conditions vary. In this respect, the safety device is still unsatisfactory in its performance.

Moreover, in the above conventional type of power window apparatus, the direction or the speed of rotation of the motor is controlled on the basis of the results of detecting the open/close operation of the motor, viz., the rotation of the motor. To this end, a sensor device for sensing the motor rotation and a control circuit for controlling the motor rotation are provided in the power window apparatus. The sensor device and the control circuit are provided separately from the drive unit, and are mounted on the drive unit or the body frame of the vehicle. The prior art suffers from an increase in the number of required parts and complexity of the process required to assemble the power window apparatus to the body frame.

SUMMARY OF THE INVENTION

Accordingly, an object of the present invention is to provide a power window apparatus with a safety device having an improved performance whereby the above-mentioned problems have o been eliminated.

Another object of the present invention is to provide a drive unit for the power window apparatus in which the number of parts is reduced and the process to assemble the power window apparatus is simplified by integrating parts in the drive unit into a single unit.

To achieve the above and other objects, there is provided a power window apparatus with a safety device in which a window is driven by a drive source, and when an object is caught in the window during the movement of the window in the closing direction, the safety device operates to stop the closing movement of the window, the power window apparatus comprising temperature detecting means for detecting ambient temperature, wherein the operation of the drive source is controlled in accordance with temperature detected by the temperature detecting means.

The power window apparatus as mentioned above further may comprise first detecting means for detecting the speed of the window movement; second detecting means for detecting whether or not an object is caught in the window by comparing the detected speed with a reference value; stopping means for stopping the movement of the window when an object is caught by the window; third detecting means for detecting the ambient temperature around the window; and altering means for altering the reference value of the second detecting means in accordance with detected temperature.

In the power window apparatus of the invention, a temperature sensor for detecting the ambient temperature of the motor as the drive source of the power window apparatus is mounted on the inner side of a housing of a power window drive unit containing the motor and a control circuit structure.

Further in accordance with the invention, there is provided a drive unit for a power window apparatus having a housing, a motor mounted on the housing and functioning as a drive source, power transmission means for driving a pulley by the motor in a reduction manner, sensor means for sensing a state of rotation of the motor, and a control circuit structure for controlling the rotation of the motor in accordance with signals output from the sensor means. In accordance with the invention, the power transmission means, the sensor means and the controller structure are mounted on the inner side of the housing.

In the drive unit, the controller structure is disposed separately from the magnet of the stator as viewed in the axial direction of the rotating shaft. Also in the drive unit, the sensor means includes a magnet fastened to the rotating shaft of the motor and at least one Hall element disposed around the magnet. The magnet is supported around a base tube, which is mounted on the rotating shaft and supports a contact of the motor. The Hall element is supported on a base, which is mounted on the housing and supports a brush of the motor.

BRIEF DESCRIPTION OF THE DRAWINGS

FIG. 7 is a flowchart showing how to alter the reference value for the detected temperature;

FIG. 8 is a graph showing variations of the relative speed during the movement of the window ranging from the fully open state to the fully closed state.

DESCRIPTION OF THE PREFERRED EMBODIMENTS

Preferred embodiments of the present invention will be described with reference to the accompanying drawings.

Figure 2:
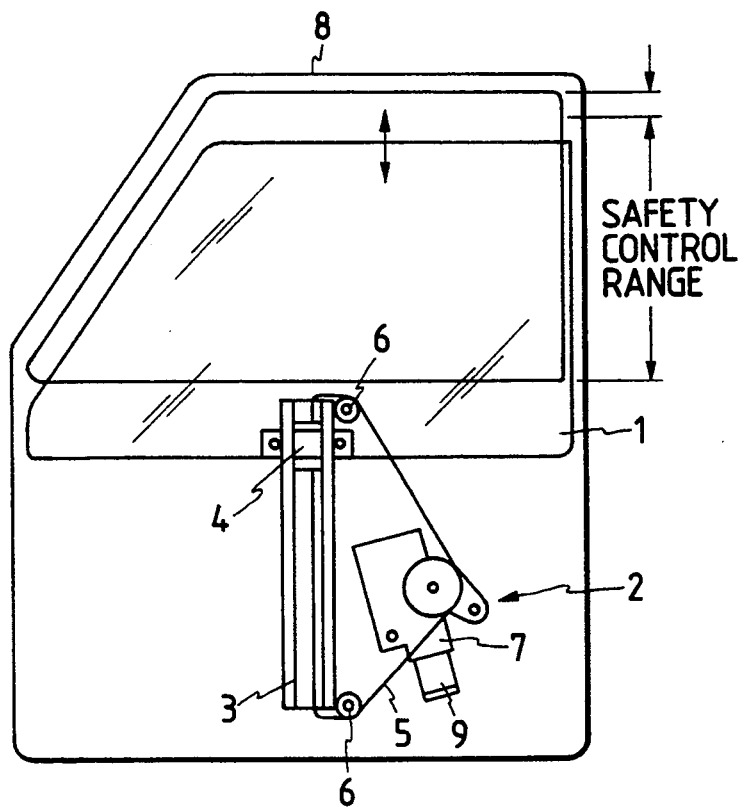
FIG. 2 is a diagram schematically showing the construction of the power window apparatus to which the present invention is applied.

In the first-described embodiment, the technical concept of the present invention is applied to the power window apparatus shown in FIG. 2. The drive unit 7 operates in a manner that the motor 9 operates to move vertically the window glass 1 by the wire 5. When the motor 9 is forwardly turned, the window glass 1 moves upward to close the window. When it is reversely turned, the window glass 1 moves downward to open the window.

Figure 1:
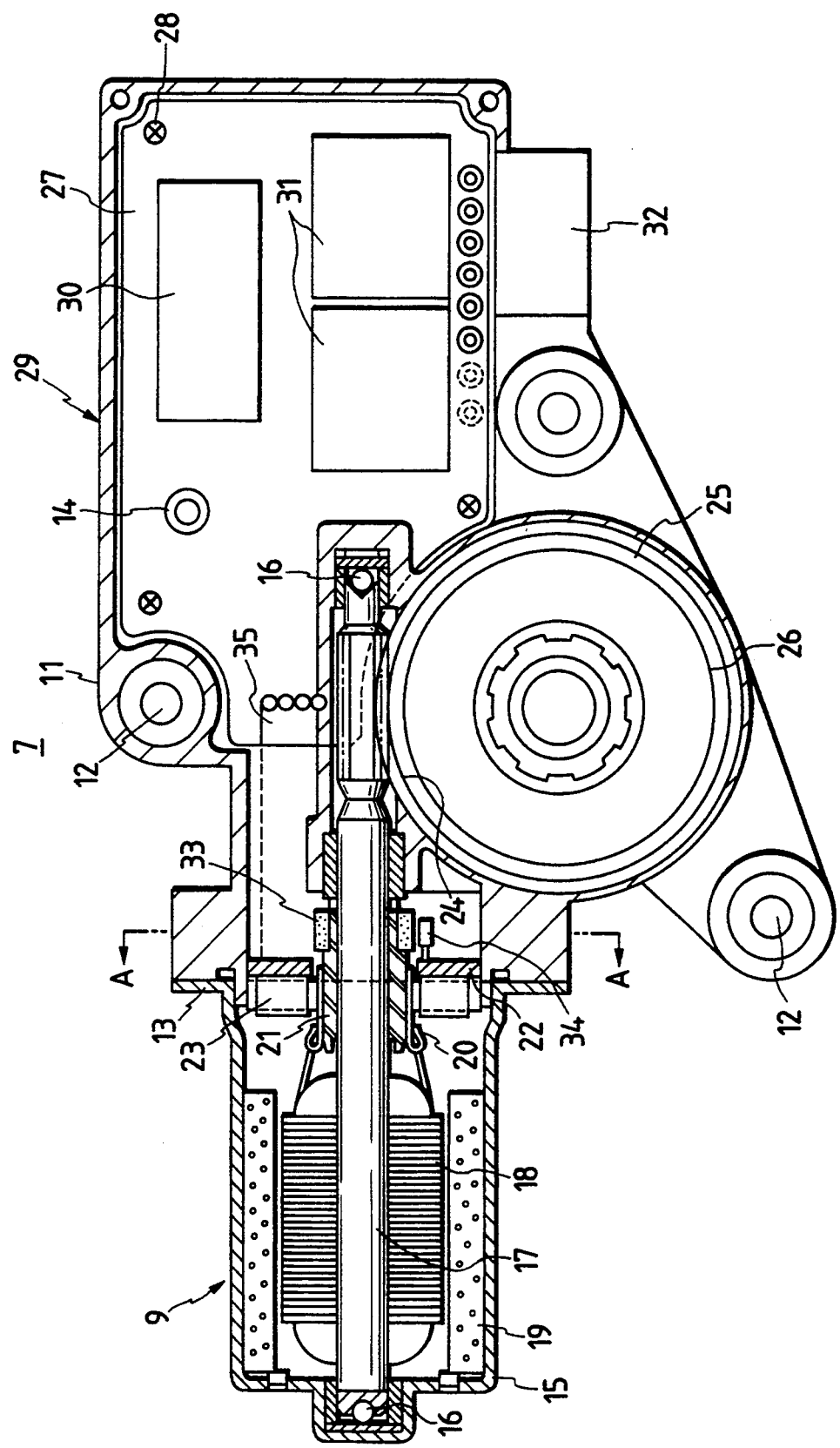
FIG. 1 is a longitudinal cross sectional view showing a drive unit for a power window apparatus constructed according to a preferred embodiment of the present invention.

The internal construction of the drive unit 7 of the power window apparatus is illustrated in FIG. 1. In the figure, a housing 11 is made of metal, for example. Holes 12 are formed at required locations of the housing 11, which holes are used for fastening the housing 11 to a car body by means of screws inserted therethrough. A motor 9 is mounted to an opening side 13 of the housing. In the motor 9, a rotating shaft 17 longitudinally extends along the center axis of a motor case 15. The rotating shaft 17 is supported by the motor case 15 and the housing 11 in a manner such that thrust bearings 16 are respectively interposed between one end of the rotating shaft and the motor case 15 and between the other end and the housing 11. A rotor 18, including an iron core and a coil, is mounted on the rotating shaft 17. A stator 19 formed of a magnet is mounted on the inner surface of the motor case 15. A tubular collar 21 having a commutator 20 thereon is fastened to the rotating shaft 17. A conductive brush 23 is brought into contact with the tubular collar 21 in a slidable manner. The conductive brush 23 is supported on a base disk 22, which is fastened to the opening side 13 of the housing 11 by means of screws, for example. As shown, a worm gear 24 forms the end portion of the rotating shaft 17.

Within the housing 11, a worm wheel 25 of large diameter, supported by a shaft, is in mesh with the worm gear 24, thereby forming a power transmission mechanism. The worm wheel 25 is integral with a pulley 26 of large diameter. The wire 4 in the power window apparatus shown in FIG. 2 is wound around the pulley 26. A circuit board 27 is fastened to another location of the housing 11 by means of screws 28. A control circuit for controlling the rotation of the motor 9 is contained in the circuit board 27. These elements form a controller structure 29.

In the controller structure 29, a microcomputer 30 and a relay switch 31 for switching the current paths to the motor 9 are mounted on the circuit board 27. A temperature sensor 14, e.g., a thermistor, is mounted on the circuit board 27. The temperature sensor 14 senses ambient temperature of the power window apparatus, more exactly, the temperature of the drive unit 7. Preferably, the controller structure 29 is separated from the magnet of the stator 19 as viewed in the axial direction of the rotating shaft. A connector 32 forms a part of the housing 11. When the connector is coupled with an external connector (not shown), the controller structure 29 is electrically connected to various types of switches, a power source, and the like, which are located outside of the five unit.

Figure 9:
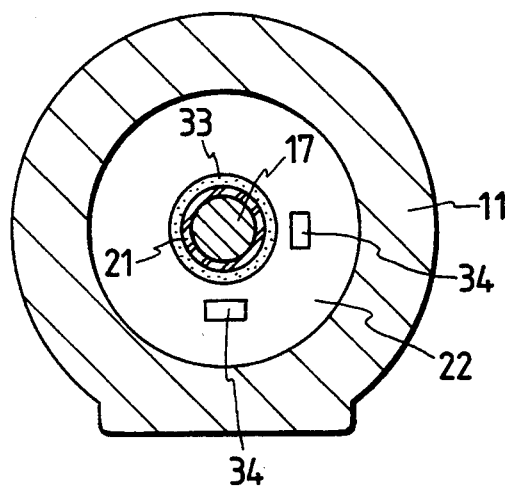
FIG. 9 is a cross-sectional view taken along a line A—A in FIG. 1.

A magnet sensor 33, shaped like a ring, is fitted and fixed around the rotating shaft 17 at the location of the opening of the housing 11. More specifically, as also shown in FIG. 9, the magnet sensor 33 is fastened around the rotating shaft 17 utilizing the tubular collar 21, which supports the 20. Two Hall elements 34 (34a and 34b) are mounted on the surface of the base disk 22, which is opposed to the surface thereof facing the conductive brush 23. The base disk 22 is mounted on the opening side 13 of the housing 11, as already referred to. The two Hall elements 34 are arrayed angularly spaced at intervals of 90° around the magnet sensor 33. The Hall elements 34 sense the magnetic poles of the magnet sensor 33, which is rotated with the rotation of the rotating shaft 17, and generate pulse signals accordingly. The Hall elements 34 function as a sensor device for detecting the rotational speed of the rotating shaft 17 on the basis of the pulse signals.

The base disk 22 and the circuit board 27 of the controller structure 29 are electrically connected with each other by jumper wire 35, for example.

In the drive unit 7 thus arranged, when the drive unit is supplied with electric power from the external power source through the connector 32, the motor 9 is driven to rotate. Thus, the shaft 17 rotates, so that the worm gear 24 is in mesh with the worm wheel 25. In turn, the pulley 26 is rotated to vertically move the window glass 1 by the wire 5, which is wound around the pulley. With rotation of the shaft 17, the magnet sensor 33 is also rotated and the Hall elements 34 generate pulse signals. The microcomputer 30 of the controller structure 29 recognizes the direction and speed of the rotation of the motor 9 on the basis of the pulse signals from the Hall elements and the current position of the window glass 1. Then, it controls a relay switch 31 and the rotation of the motor 9. As a consequence, the window glass is vertically moved as desired.

Figure 3:
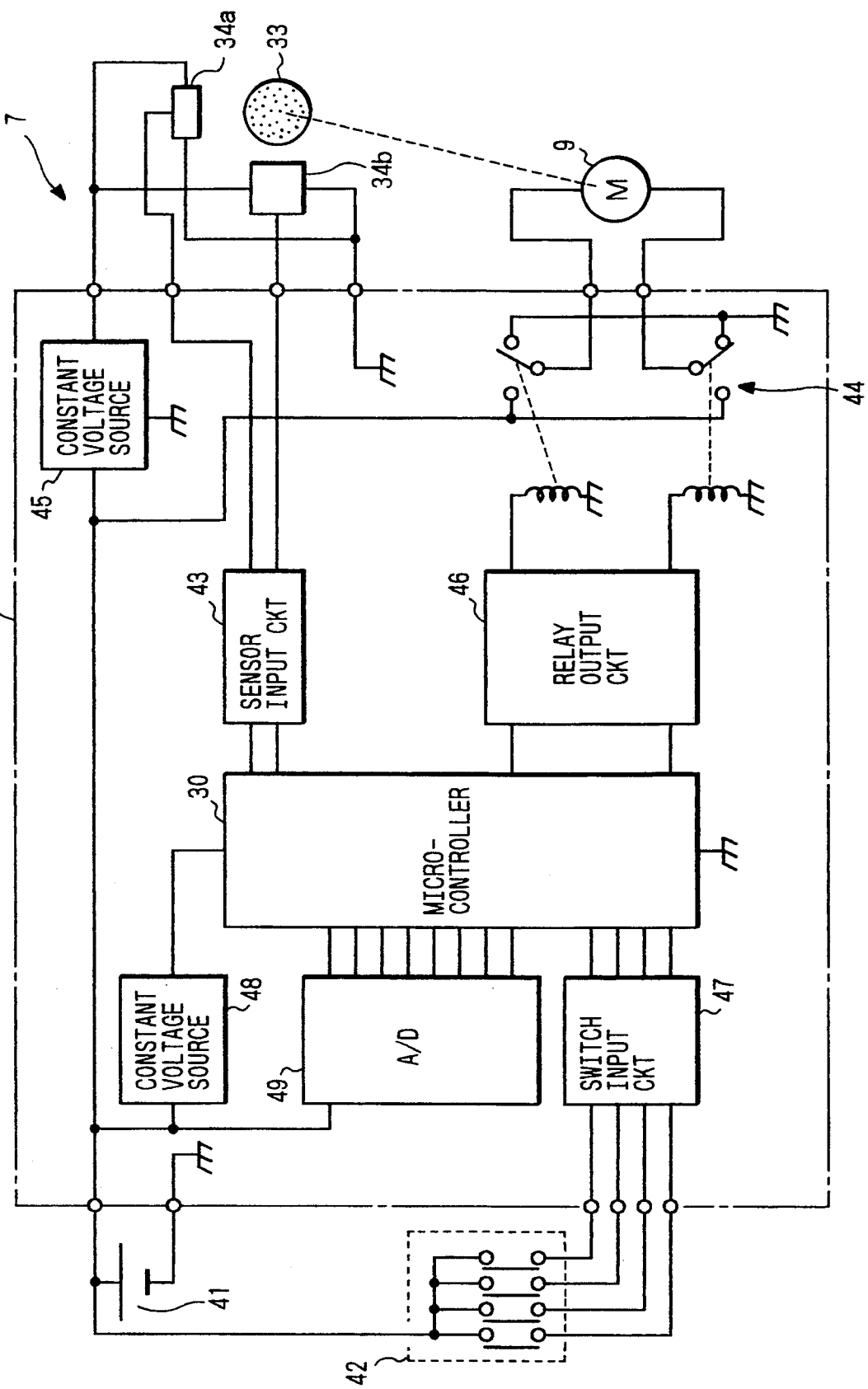
FIG. 3 is a block diagram showing a control system for the power window apparatus according to the present invention.

FIG. 3 is a block diagram showing an overall control system for the power window apparatus according to the present invention. As shown, the drive unit 7 is coupled with a control unit 40, which is further connected to the vehicle's battery 41, a function switch 42, and the like. The control unit 40 contains a microcomputer 30 as a major component. The microcomputer 30 is connected through a sensor input circuit 43 to the Hall elements 34a and 34b acting as pulse generating devices 11. The microcomputer 30 recognizes the motor speed and the direction of rotation of the motor 9 on the basis of pulse signals from the Hall elements. The motor 9 is connected through a relay switch 44 to the battery 41. The relay switch 44 is also connected through a relay output circuit 46 to the microcomputer 30. The motor 9 is selectively rotated in the forward or reverse direction through the relay switch 44 under control of the microcomputer 30.

A function switch 42 is connected through a switch input circuit 47 to the microcomputer 30. The function switch 42 is used for selecting the drive mode of the window, i.e., an automatic mode or a manual mode, and the direction of the window movement, i.e., the opening direction or the closing direction, under control of the microcomputer 30. The battery 41 is connected to the microcomputer 30 through a constant voltage source 48 and an A/D converter 49.

Figure 4:
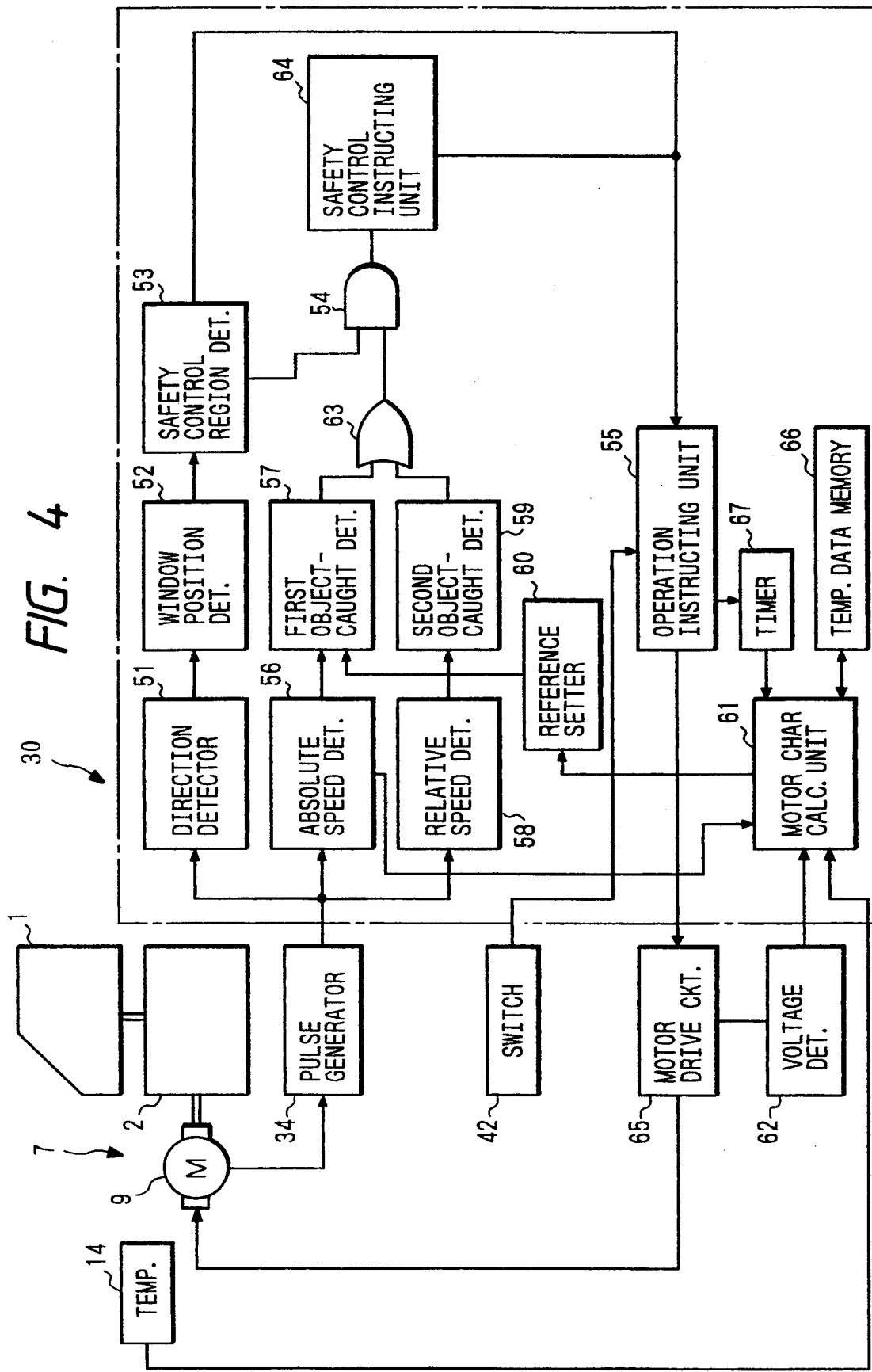
FIG. 4 is a functional block diagram of a microcomputer used in the control system for the power window apparatus of FIG. 3.

FIG. 4 is a functional block diagram of the microcomputer used in the control system for the power window apparatus of FIG. 3. In FIG. 4, like or equivalent portions are designated by like reference numerals in FIG. 3. In FIG. 4, the microcomputer contains a system for detecting a safety control region from the open/closed state of the window glass, and another system for detecting a state where an object is caught in the window glass.

A direction detector 51 for detecting the opening direction or the closing direction of the window is provided in the system for detecting the safety control region. The detector 51 converts the pulse signals from the Hall elements 34a and 34b into two-bit binary signals, detects the period of variation of the two-bit signal, and recognizes the direction of rotation of the motor 9 on the basis of the signal variation period, thereby to recognize the opening or closing direction of the window.

A window position detector 52 detects the current position of the window glass 1. The detector 52 may be implemented with an up/down counter. The counter is set to 0 when the window is completely closed. The counter thus initialized counts in the negative direction pulse signals generated by the motor turning in the forward direction, and counts in the positive direction pulse signals generated by the motor turning in the reverse direction.

A safety-control-region detector 53 receives the output signals of the window position detector 52, and recognizes a region ranging from the position of the window of the fully open state to a position just short of the fully closed state on the basis of the received output signal. The safety control operation is allowed within this range. As will be described later, just before it is completely closed, the window glass 1 comes into contact with the sash. The contact resistance generated at this time presents a state resemblant to the state of the window when an object is caught in the window. If no appropriate measure were taken, the recognizing device would mistakenly recognize the state of the window just before it is completely closed as the completely closed state of the window. To avoid such a mistaken recognition, the safety control region is appropriately limited. In this embodiment, the safety control region covers 90% of the entire region of the open state of the window.

The output signal of the safety-control-region recognizing device 53 is input to one input of an AND gate 54, and also to an operation instructing unit 55.

The system for detecting the state of an object being caught in the window contains an absolute speed detector 56, a relative speed detector, and the like. The absolute speed detector 56 detects the rotational speed of the motor 9, viz., determines whether or not the speed of the opening/closing movement of the window exceeds a preset reference value. To this end, it detects the time interval ranging from switch-on to the leading edge of the next pulse or between the leading edges of the adjacent pulses. A first object-caught detector 57 detects a state of the window where the absolute speed of the window movement is smaller than the reference value whereupon it decides that an object is caught in the window. In this instance, when the motor speed is 20 ms/turn, a determination is made that an object is caught in the window.

The relative speed detector 58 detects time intervals between successive pulses, and recognizes a change of the opening/closing speed of the window, viz., a relative speed, on the basis of ratios of the detected time intervals. A second object-caught detector 59 detects a state of the window where the relative speed is smaller than a preset value, whereupon it determines that an object is caught in the window. In this instance, a 10% or smaller decrease of the relative speed indicates the state in which an object is caught in the window.

The first object-caught detector 57 is connected to a reference setter 60, which is provided for setting a preset reference value and for altering the set reference valued if required. The reference setter 60, which is also connected to a motor-characteristic calculating unit 61, sets 20 ms (already referred to) as the reference value, and if required, alters the set value according to the output signal from the motor-characteristic predictor 61. The motor-characteristic calculating unit 61 stores the correlation characteristics of the reference values of the absolute speed to motor temperature information, as will be described later. The motorcharacteristic calculating unit 61 is connected to a temperature sensor 14 provided in the drive unit 7, a temperature data memory 66 for storing the temperature sensed by the temperature sensor 14, and a timer 67 for counting the operation time of the motor 9.

The motor-characteristic calculating unit 61 stores motor temperature information, which is gathered by the temperature sensor 14, in the temperature data memory 66, and calculates the current rotating state of the motor 9 on the basis of the stored or detected temperature, the motor operation time interval, and the absolute speed data detected by the absolute speed detector 56. A reference value set signal, based on the calculation result, is output to the reference setter 60, which in turn alters the reference value in the first object-caught detector 57.

This embodiment contains a voltage detector 62 for detecting the drive voltage applied to the motor 9. The detected drive voltage is applied to the motor-characteristic calculating unit 61. The motor drive voltage as well as the correlation characteristic data are stored in the motor-characteristic calculating unit 61.

The output signals of the first and second object-caught detector 57 and 59 are input to an OR gate 63, and the output signal of the OR gate 63 is applied to another input terminal of the AND gate 54.

The output signal of the AND gate 54 is input to a safety-control instructing unit 64. Upon receiving an object-caught detect signal, the safety-control instructing unit 64 controls an operation instructing unit 55 to start the safety control operation. In this embodiment, the window glass is moved a distance of 12 cm in the opening direction from the current position of the window.

It is evident that an operator can manually operate the function switch 42 to enter a direction instruction to the function switch 42 of the microcomputer 30 to cause the motor to rotate forwardly or reversely. The output signal of the operation instructing unit 55 controls the rotation of the motor 9 through a motor drive circuit 65 including a relay switch.

Figure 5:
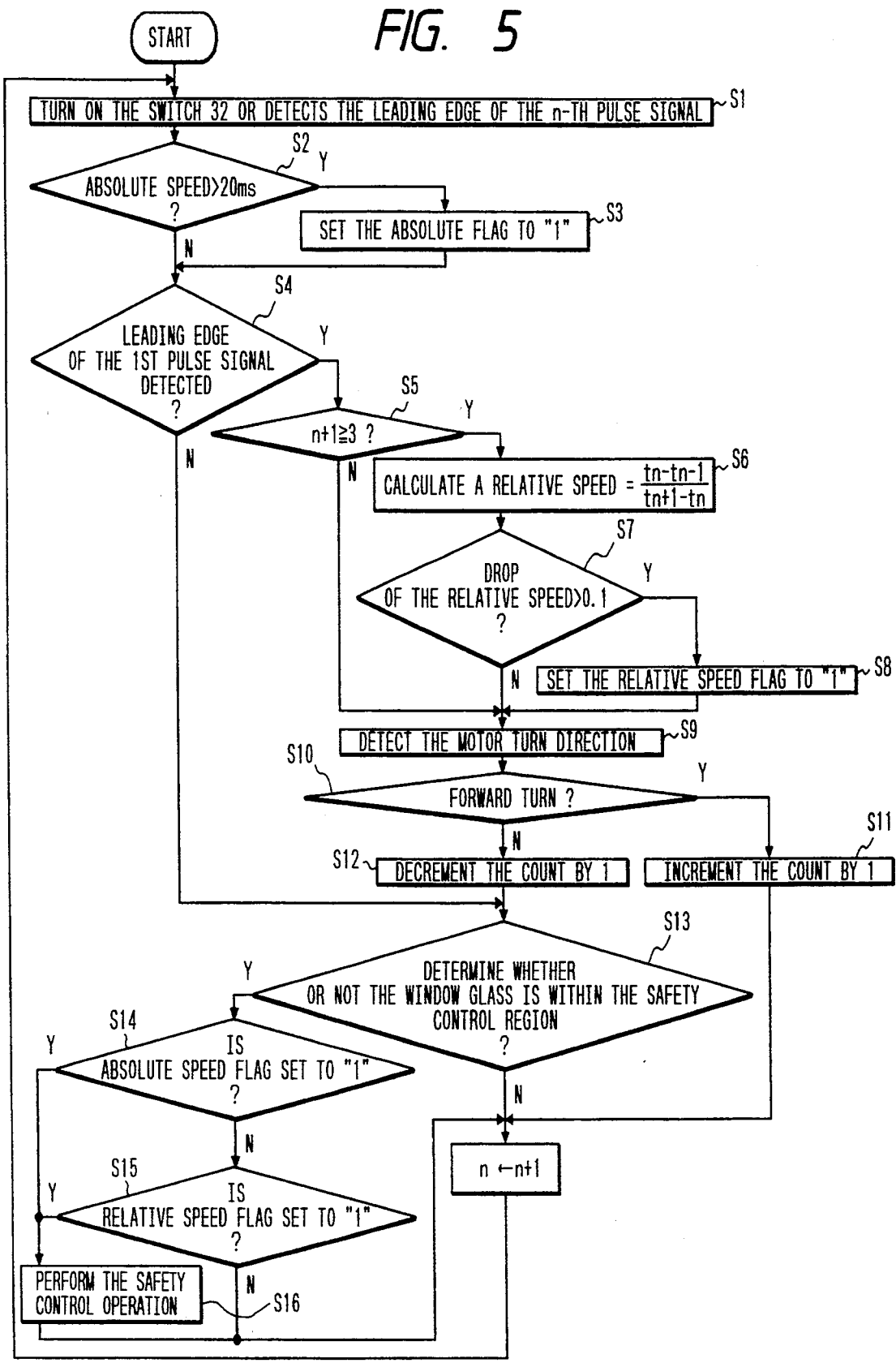
FIG. 5 is a flowchart showing the operation of the safety device according to the above embodiment of the present invention.

The operation of the safety device thus arranged will be described with reference to the flowchart of FIG. 5. When the function switch 42 is turned on, the on-time of the switch is detected (Step S1). With rotation of the motor 9, the Hall elements 34a and 34b generate pulse signals, which are input to the microcomputer 30. During a time period lasting from the switch-on detection (Step S1) to detection of the leading edge of the first (n=1) pulse signal, the absolute speed detector 56 determines whether or not the absolute speed exceeds 20 ms of the reference speed (Step S2). If it exceeds 20 ms, the first object-caught detector 57 recognizes that the absolute speed of the motor 9 is smaller than the reference speed, and hence the fact that an object is caught in the window, and sets the absolute speed flag to "1" (Step S3).

When the leading edge of the first pulse signal is detected (Step S4), the relative speed detector 58 will detect the relative speed; however, it fails to detect the relative speed because $n+1 \geq 3$ does not hold. When the leading edge of the second pulse signal is detected, the relative speed detector 58 cannot detect the relative speed. When the leading edge of the third pulse signal is detected, the relative speed detector 58 calculates the ratio of the time interval between the leading edges of the first and second pulse signals and the time interval between the leading edges of the second and third pulse signals $((t_2-t_1)/(t_3-t_2))$. The ratio is treated as the relative speed of the motor 9 in the opening/closing operation (Step S6). The second object-caught detector 59 checks whether or not drop of the detected relative speed is 10% or more (Step S7). If it is more than 10%, it sets the relative speed flag to "1" (Step S8).

Subsequently, the ratio of the pulse-to-pulse time intervals $((t_n-t_{n-1})/(t_{n+1}-t_n))$ is calculated (Step S6) every time the leading edge of the n-th pulse signals is detected, whereby gaining the relative speed, and the second object-caught detector checks the drop of the relative speed (Step S7).

The direction detector 51 detects the turning direction of the motor 9, viz., the opening or closing direction of the window, using the pulse signals from the Hall elements 34a and 34b (Step S9). The window position detector 52 decides whether or not the motor turns forwardly or reversely on the basis of the opening or the closing direction (Step S10). When the motor turns forwardly, the counter is decremented by 1 (Step S11). When it turns reversely, the counter is incremented by 1 (Step S12).

The safety-control-region detector 53 checks whether the window glass is within the safety control region on the basis of the count of the counter (Step S13). If it is not within the safety control region, control returns to the starting step. If it is within the safety control region, the signal is output to the AND gate 54.

The detected signals of the relative speed and the absolute speed are input through the OR gate 63 to the AND gate 54. The signal from the safety-control-region detector 53 enables the AND gate 54 to allow the detected signals to pass to the safety-control instructing unit 64. The safety-control instructing unit 64 successively checks if the absolute speed flag is set (Step S14) and if the relative speed flag is set (Step S15). If either of the flags is set, it is decided that an object has been caught in the window, whereupon the operation instructing unit 55 is operated to perform the safety control operation (Step S.B.). During the safety control operation, the microcomputer 30 controls the relay switch 44 through the relay output circuit 46, viz., the motor drive circuit 65, thereby to invert the polarity of the current fed to the motor 9. As a result, the motor 9 is reversely rotated to move the window glass a predetermined distance (12 cm) in the window opening direction, and then stops the window. Accordingly, the object is released from the window, thereby to secure the safety of the object.

Figure 6:
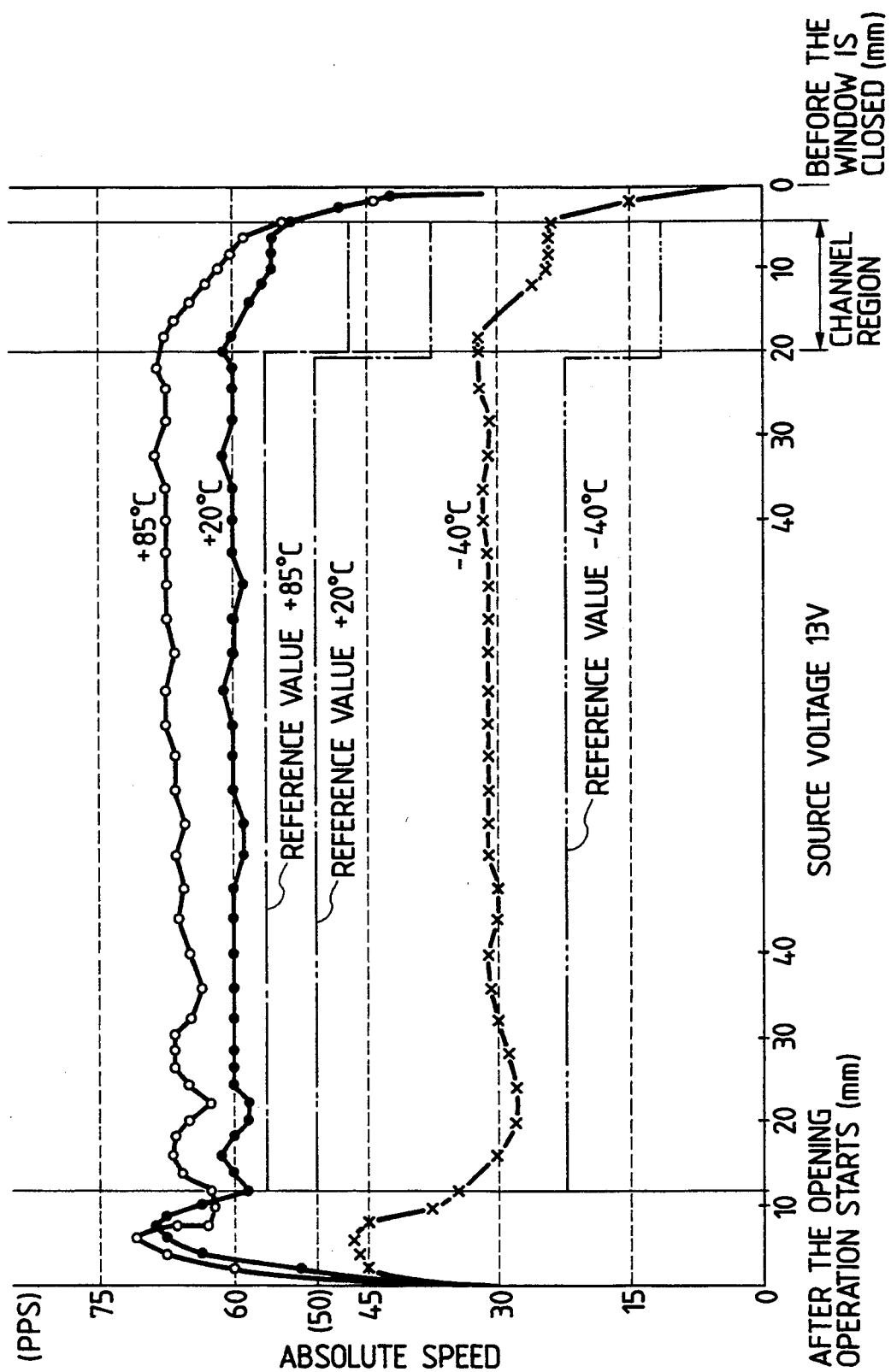
FIG. 6 is a graph showing variations of absolute speed during the movement of the window ranging from the fully open state to the fully closed state.

FIG. 6 is a graph showing variations of the absolute speed during the movement of the window ranging from the fully open state to the fully closed state. At the initial stage of the opening operation of the window, the absolute speed is high because of play in the drive unit 7. Upon termination of play, the absolute speed temporarily decreases when the load is abruptly applied. After a relatively short time, the absolute speed rises to reach a stationary value. The closing operation of the window continues at this speed. Immediately before the window is completely closed, the window comes into contact with the weather stripping of the sash, and the contact resistance generated thereby increases the load on the drive source or motor. The absolute speed subsequently decreases to zero when the window glass hits the sash or it is completely closed.

The viscosity of the grease used as a lubricant in the motor or other portions of the drive unit and the elasticity of the weather stripping of the sash varies depending on the ambient temperature of the vehicle. When the grease viscosity or rubber elasticity changes, the absolute speed as the reference speed of the motor also changes. In the vicinity of the region where the window is completely closed, the window glass comes into resilient contact with the weather stripping of the sash, so that the rate of change of the absolute speed changes. This state is illustrated in FIG. 6. In the figure, the drive voltage for the motor was fixed at 13 V. Three motor temperatures, −40° C., +20° C., and +85° C., were used. The variation of the absolute speed at each of those temperatures was plotted in terms of the rate of change of the absolute speed with respect to the reference speed. As seen from the graph, as a general tendency, the absolute speed decreases as the temperature decreases. Particularly when it is close to the sash, viz., in a state approximate to the fully closed state, this tendency is marked. If the reference value of the first object-caught detector 57 is at a fixed value irrespective of temperature variation, the actual speed of the motor becomes high relative to the reference speed when temperature is high. As a result, the object-caught sensitivity becomes poor and a time lag is created between the time when the dangerous situation first occurs and its detection. When the temperature is low, the difference between the reference speed and the motor speed becomes small and the motor speed varies. The varied motor speed causes the device to mistakenly detect a state of the window when no object is trapped as an object-caught state. In this case, the closing operation of the window cannot be properly completed.

To cope with this problem, in this embodiment of the invention, the temperature of the motor 9, which closely tracks the ambient temperature, is sensed by the temperature sensor 14. The detected motor temperature is treated as the ambient temperature. Using the ambient temperature, the motor-characteristic calculating unit 61 calculates a state of motor speed. In this calculation, referring to a prestored correlation of the ambient temperature and the absolute speed reference speed, a suitable reference value is read out and transferred as a reference value set signal to the reference setter 60. The reference setter 60 compares the value of the reference value set signal with the current reference value, and alters the reference value of the first object-caught detector 57 according to the comparison result. In the figure, the reference values for the respective temperatures, +85° C., 20° C., and −40° C., are indicated by a broken long-and-short-dash line, a broken long-and-two-short-dashes line, and a broken long-and-three-short-dashes line, respectively. As seen, the reference values of the absolute speed are reduced as the temperature decreases. Particularly, in the channel region where the window glass comes into contact with the weather stripping of the sash, the difference between the adjacent reference values is set to be large.

The operation of altering the reference value is charted in FIG. 7. To start, the voltage detector 62 detects the motor drive voltage V, which has a strong influence on the absolute speed of the motor (Step S21). Then, the temperature sensor 14 senses the motor temperature T1 (Step S22). It is checked whether or not the temperature data previously detected is stored in the temperature data memory 66 (Step S23). If it is not stored, the detected motor temperature T1 is stored as ambient temperature T2 in the memory (Step S24). Subsequently, the absolute speed detector 56 detects the present motor absolute speed v (Step S26). The data of the motor drive voltage V, the ambient temperature T2, and the motor absolute speed v are input to the motor-characteristic calculating unit 61. Upon receipt of the data, the calculating unit 61 calculates the state of motor rotation, and sets a reference value (Step S27). Since the motor drive voltage V relates to the motor absolute speed v, it previously corrects a variation of the motor absolute speed using the difference between the reference voltage and the detected drive voltage, and the present motor absolute speed v. It reads out the reference value corresponding to the detected ambient temperature T2, referring to the ambient temperature T2 and the correlation characteristic data prestored in the motor-characteristic calculating unit 61, and sends a reference value setting signal. When receiving this signal, the reference setter 60 sets the corresponding reference value in the first object-caught detector 57 (Step S25). In the case of the characteristic as shown in FIG. 6, when the temperature is high, a reference value shorter than 20 ms is set as the reference of the absolute speed in the first object-caught detector 57. When the temperature is low, it is longer than 20 ms.

If the window movement is successively repeated, the motor is heated but the ambient temperature remains unchanged. In this case, if the reference value is set using the motor temperature as the ambient temperature, it fails to follow the actual opening/closing operation characteristic of the window. To avoid this, after checking if the ambient temperature data is stored (Step S23), it is checked whether or not the motor has stopped for 30 minutes or more, on the basis of the output signal of the timer 67, which operates in response to the signal from the operation instructing means 55 (Step S25). If the motor has not been operated within the past 30 minutes, the detected motor temperature T1 is used as it is as the ambient temperature T2, and the subsequent process steps (Steps S26 and S27) are executed to set the reference value. That is, if it has been stopped for more than 30 minutes, the ambient temperature T2 is read, as the present ambient temperature, from the temperature data memory 66, and the subsequent process steps (Steps S26 and S27) are executed on the basis of the ambient temperature to set the reference value. On the other hand, if the motor has been driven a plurality of times within the past 30 minutes, the temperature data detected 30 minutes prior is used as the ambient temperature. This succeeds in solving the erroneous setting of the reference value due to motor heating.

As described above, when the absolute speed of the motor changes as the result of ambient temperature change, the reference value for object-caught detection is altered. Accordingly, the catching of an object in the window can be exactly detected using the motor absolute speed, ensuring a reliable safety operation.

In the embodiment described above, the temperature sensor 14 is mounted on the circuit board 27, which is mounted on the inner side of the housing 11 in the drive unit 7. No external wiring to connect the temperature sensor 14 to the microcomputer 30 is required. This contributes to reducing the size and complexity of the power window apparatus.

A reduction of the motor torque due to the temperature increase which occurs when the motor is operated can be corrected if the temperature rise is recognized using the temperature sensed by the temperature sensor.

The temperature sensor may be disposed at a location inside the door panel on which the power window apparatus is installed or along sash so as to sense temperature of the surrounding air.

If the motor drive voltage is held constant using a constant voltage source, for example, the voltage detector may be omitted.

FIG. 8 is a graph showing variations of the relative speed during the movement of the window ranging from the fully open state to the fully closed state.

Within the scope of the invention, the reference value for the second object-caught detector for detecting the object-caught can be set on the basis of the relative speed of the motor. In the graph, three variations of relative speed are depicted for three different temperatures, as in the case of the absolute speed characteristics.

Use of the object-caught detector for both the absolute speed and the relative speed provides a more exact object-caught detection. Also in a case where on object caught in the window is directly detected by detecting the speed and quantity of the window movement, the reference values can be set depending on temperature change.

As described above, in a power window apparatus with a safety device in which a window is driven for opening and closing by a drive source, a temperature detector detects the ambient temperature, and the operation of the drive source is controlled in accordance with the temperature detected by temperature detector.

With the invention, variations in the operation of the drive source caused by temperature changes can be corrected, and the state where an object is caught in the window can be detected without fail, ensuring a reliable safety control operation.

In the power window apparatus in which the object-caught state is detected by comparing the opening/closing movement of the window with a reference value, the ambient temperature of the window is detected, and the reference value of the object-caught detector is altered according to the detected temperature. Reliable detection of the object-caught state is secured irrespective of ambient temperature variations.

The temperature sensor for detecting the ambient temperature of the motor acting as the drive source of the power window apparatus is mounted on the inner side of the housing of the power window drive unit containing the motor. No increase of the number of wires is required, leading to a size reduction of the power window apparatus.

It is noted that the sensor means for detecting the rotation of the motor and the control circuit structure for controlling the motor rotation, together with the motor and the gear mechanism, and the like, are assembled into the single housing. Accordingly, the drive unit can contain most of the electrical system for the power window apparatus.

The drive unit 7, and the components shown in FIG. 2, such as the rail 3, the slider 4, and the wire 5, may be assembled into a single unit. If so assembled, when the power window apparatus is assembled into the car body frame, only the step to assemble the single unit is required. In this respect, the assembly work is remarkably simplified.

It is further noted that the controller structure 29 is separated from the magnet of the stator 19 as viewed in the axial direction of the rotating shaft 17. Therefore, the magnetic field developed by the magnet exerts little influence on the controller structure 29. Thus, the controller structure 29 will not suffer from EMI interference by the magnet.

Additionally, it is noted that, in the invention, the magnet sensor 33 of the sensor means is supported around the rotating shaft 17 in such a manner that the base tube 21 supporting the contact 20 of the brush section of the motor 14 is interposed between the magnet sensor and the rotating shaft. This feature implies that the mounting of the magnet sensor 33 is completed simultaneously with completion of the assembling work of the brush section. Additionally, in the invention, the Hall elements 34 and the conductive brush 23 as well are mounted on the base disk 22, which is mounted on the opening side of the housing 11. Accordingly, when the base disk 22 is mounted on the housing 11, the conductive brush 23 and the Hall elements 34 are simultaneously mounted. This also contributes to simplification of the assembly work.

As described above, in the invention, the motor of the power window apparatus is mounted on the housing. The power transmission mechanism for the motor, the sensor means, and the control circuit structure are assembled into the housing, whereby the drive unit is constructed in the form of a single unit. Accordingly, the invention succeeds in reducing the number of parts forming the power window apparatus, resulting in simplification of the assembly work of the power window apparatus on the car body.

The arrangement of the motor magnet and the control circuit structure, which are separated from each other as viewed in the motor axis, protects the control circuit structure from EMI interference caused by the motor. Further, the sensor is formed with the magnet fixed to the rotating shaft of the motor and at least one Hall element disposed around the shaft. The magnet is supported on the base tube, which supports contact of the motor. The Hall element is supported on the base disk, which supports the brush of the motor. Therefore, the number of parts of the drive unit can be reduced.

What is claimed is:

1. A power window apparatus, comprising:
   a drive source for moving a window between fully open and fully closed positions;
   first detecting means for detecting a speed of movement of said window;
   second detecting means for detecting whether or not an object is caught in said window by comparing a speed detected by said first detecting means with a reference value;
   stopping means for stopping movement of said window when an object is caught in said window as detected by said second detecting means;
   third detecting means for detecting an ambient temperature of the window moved by said drive source; and
   altering means for altering said reference value of said second detecting means in accordance with the temperature detected by said third detecting means.

2. The power window apparatus of claim 1, wherein said drive source comprises a motor, and said third detecting means comprises a temperature sensor for detecting an ambient temperature of said motor, said temperature sensor being mounted on an inner side of a housing of a power window drive unit containing said motor.

3. The power window apparatus of claim 1, wherein said first detecting means comprises a pair of Hall elements positioned adjacent a rotating shaft of said motor.

4. The power window apparatus of claim 1, further comprising means for detecting a safety control region for said window.

5. The power window apparatus of claim 4, wherein said means for detecting said safety control region comprises direction detecting means and means for detecting a position of said window.

6. The power window apparatus of claim 1, wherein said second detecting means comprises first caught-object detecting means for detecting when an absolute speed of window movement becomes less than said reference value, and a second caught-object detecting means for detecting when a relative speed of said motor becomes less than a second reference value.

7. The power window apparatus of claim 1, wherein said altering means comprises means for extracting a reference value from a table correlating absolute motor speed values to temperature values.

8. The power window apparatus of claim 1, wherein said third detecting means detects a temperature of said motor as said ambient temperature.

9. The power window apparatus of claim 1, wherein said stopping means lowers said window a predetermined distance after stopping movement of said window.

10. A method for operating a power window, comprising the steps of:
moving said window towards a closed position;
detecting a speed of movement of said window;
detecting whether or not an object is caught in said window by comparing said speed of movement of said window with a reference value;
stopping movement of said window when an object is caught in said window as determined in said step of comparing said speed of movement of said window with said reference value;
detecting an ambient temperature of said window; and
altering said reference value in accordance with the detected temperature.

11. The method of claim 10, further comprising the step of detecting a safety control region for said window, said step of stopping movement of said window being carried out only in said safety control region.

12. The method of claim 11, wherein said step of detecting said safety control region comprises detecting a direction of movement and a position of said window.

13. The method of claim 10, wherein said step of altering said reference value comprises extracting a reference value from a table correlating absolute motor speed values to temperature values.

14. The method of claim 10, wherein said step of detecting said ambient temperature comprises detecting a temperature of said motor.

15. The method of claim 10, further comprising the step of lowering said window a predetermined distance after stopping movement of said window.

16. The method of claim 10, further comprising the steps of detecting whether said motor has been operated a plurality of times within a predetermined preceding time period, and, if said motor has been operated a plurality of time within said predetermined preceding time period, setting said reference value in accordance with a value of said ambient temperature at a time prior to said predetermined preceding time period.

17. In a drive unit for a power window apparatus having a housing, a motor mounted in said housing and functioning as a drive source for raising and lowering a window, power transmission means for driving a pulley with said motor in a reduction manner, sensor means for sensing a state of rotation of said motor, and a control circuit for controlling rotation of said motor in accordance with signals output from said sensor means, the improvement wherein said power transmission means, said sensor means, and said controller structure are mounted on an inner side of said housing.

18. The drive unit according to claim 17, wherein said controller structure is disposed separately from a magnet of a stator of said motor as viewed in an axial direction of a rotating shaft of said motor.

19. The drive unit according to claim 18, wherein said sensor means comprises a magnet fastened to said rotating shaft of said motor and at least one Hall element disposed around said magnet, said magnet being supported around a base tube mounted on said rotating shaft and supporting a contact of said motor, and said Hall element being supported on a base mounted on housing and supporting a brush of said motor.

* * * * *